US007643948B2

(12) United States Patent
Balinsky et al.

(10) Patent No.: US 7,643,948 B2
(45) Date of Patent: Jan. 5, 2010

(54) SECURE RESOURCE TRACKER

(75) Inventors: Helen Balinsky, Cardiff (GB); Edward McDonnell, Bristol (GB); Eytan Cohen, Raanana (IL); Moshe Uzan, Netanya (IL); Mark Ripenbein, Netanya (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 81 days.

(21) Appl. No.: 11/975,193

(22) Filed: Oct. 18, 2007

(65) Prior Publication Data

US 2009/0100946 A1 Apr. 23, 2009

(51) Int. Cl.
*G01F 17/00* (2006.01)

(52) U.S. Cl. ................................ 702/50; 347/7; 347/85; 710/8

(58) Field of Classification Search .................. 702/50, 702/106, 160, 178, 188; 347/6, 84, 85, 86, 347/7; 711/170; 705/50; 340/572.1; 710/8
See application file for complete search history.

(56) References Cited

U.S. PATENT DOCUMENTS 6,106,108 A 8/2000 Cluet
6,802,581 B2 * 10/2004 Hasseler et al. ................ 347/7
7,234,801 B2 6/2007 Silverbrook
2004/0257231 A1 * 12/2004 Grunes et al. ............ 340/572.1
2006/0015752 A1 * 1/2006 Krueger ...................... 713/193
2006/0106719 A1 5/2006 McDonnell et al.
2006/0146100 A1 7/2006 Dull et al.
2006/0279588 A1 12/2006 Yearworth et al.
2007/0101093 A1 5/2007 Lawrence
2007/0214055 A1 * 9/2007 Temko ........................ 705/22
2008/0059659 A1 * 3/2008 Moritani et al. ................ 710/8

FOREIGN PATENT DOCUMENTS

GB 2425603 A 11/2006

* cited by examiner

*Primary Examiner*—John H Le

(57) ABSTRACT

A system for tracking resource parameters includes a resource having an associated memory tag; a parameter sensing element sensing a parameter of the resource; and a memory tag reader/writer. The system is configured to store information gathered from the parameter sensing element on the memory tag.

16 Claims, 9 Drawing Sheets

SECURE RESOURCE TRACKER

BACKGROUND

In supply chain management or other logistics applications, it may be desirable to monitor the location, environment, and usage of resources. This additional information can be used for more efficient resource allocation, to verify the authenticity and condition of goods, and for verification of the compliance of vendors and consumers with warranty conditions.

Ideally, this information would be collected without manual intervention and securely stored within the resource or its packaging. Upon receiving an authenticated demand, the information would be transmitted in a manner that allows verification of its legitimacy. In this way, the information associated with the resource is confirmable both in its connection to the particular resource and in authenticity.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
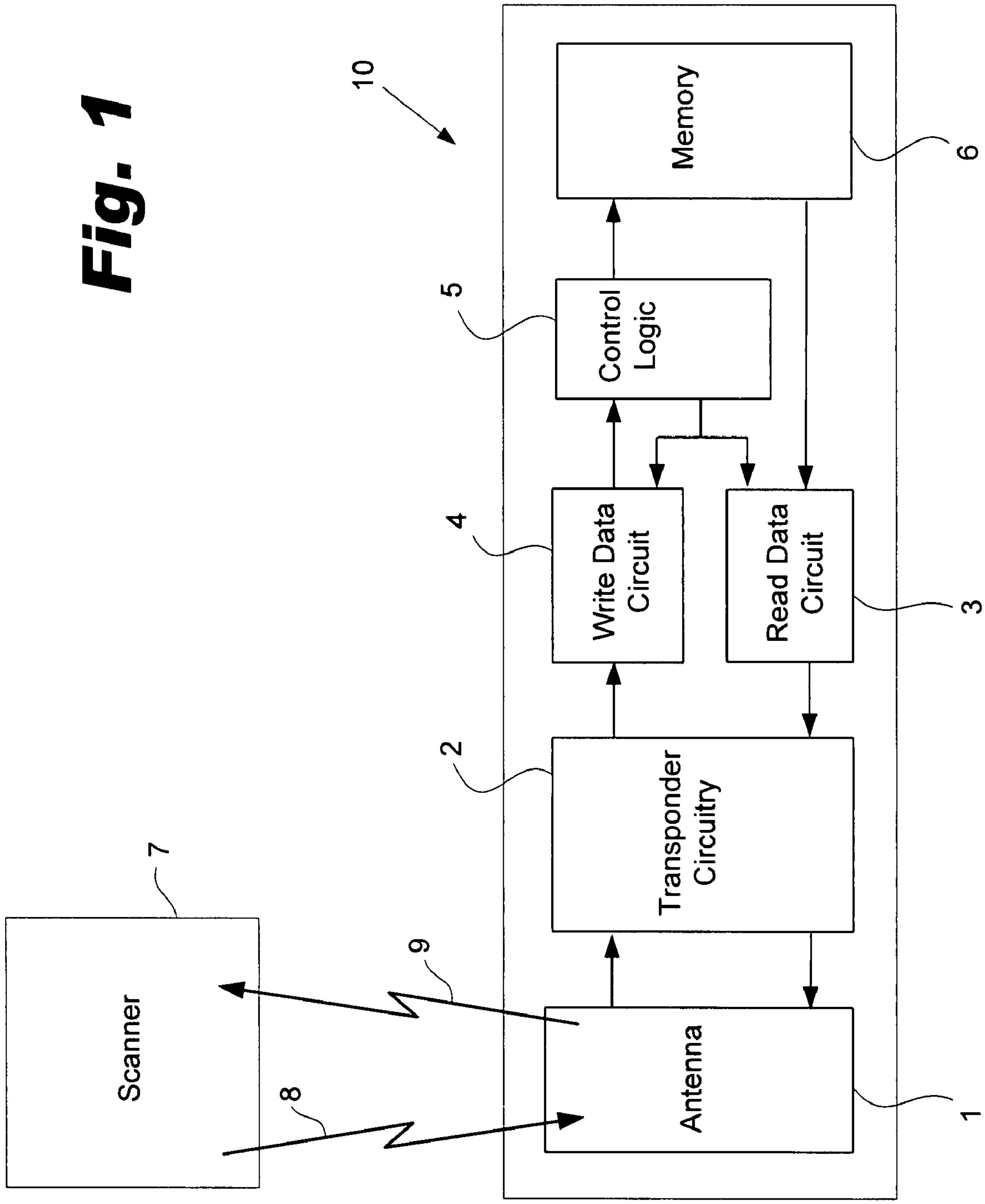
FIG. 1 is schematic diagram of one illustrative embodiment of a memory tag, according to principles described herein.

In many areas, it may be desirable to monitor the conditions under which a resource is stored, transported, or used.

This information can be used to efficiently allocate resources, to verify the authenticity and condition of goods and for verification of compliance with warranty conditions. This may be especially important when local variations in certain parameters can be tolerated, but the accumulative effect should stay below a certain threshold. It may also be desirable to provide anti-counterfeit measures to consumable resources.

Also, in many situations it may be desirable to know the details of a consumable resource, particularly the usage information regarding that resource. In the past, the compilation and maintenance of the details regarding the monitored parameters of a resource was performed manually using paper records. Not only did this involve a considerable amount of time in recording the details for a resources or component, but, more importantly, required a large amount a physical records to be stored.

Although the advent of electronic data capture and storage has greatly reduced the physical space required to maintain such component or apparatus history, it has not resolved the problems of data integrity and applicability. When data is stored separately from the apparatus or component in question, the data integrity and applicability is more difficult to ensure.

In some instances, when a resource must be consumed or stored under certain conditions, a consumer may have an incentive to inaccurately report the usage or maintenance information. For example, the consumer may inaccurately report usage information if accurate reporting would have an adverse effect on the validity of a warranty. Consequently, it may be desirable for the information to be securely recorded without input from the consumer or customer.

In other cases, it may also be desirable to record the usage of counterfeit or alternative-brand resources. For example, a consumable item, such as an ink cartridge, can be provided with an integrated circuit chip enabling it to be authenticated by a printer. The chip stores a private key of a public/private key pair, and includes functionality for responding to a challenge issued by the printer. When the chip receives a challenge, it encrypts an element included in the challenge using the stored private key, and returns the encrypted element to the challenging apparatus. The printer decrypts the returned encrypted element using the public key associated with an authentic ink cartridge. Only if the result of this decryption matches the original element included in the challenge does the printer accept the consumable item as genuine or manufacturer-approved.

Using such an arrangement, it is possible to ensure that only manufacturer-approved consumable items are used with an apparatus. This has advantages for a manufacturer providing warranty services because the manufacturer can be certain that any defects arising in a device are not a result of consumable items of doubtful provenance and quality having been used with the device. However, a user of the device may desire to use consumable items from any source. A solution is therefore desirable that will allow a user to use consumable items from any source, while maintaining a record of third-party consumables used so as to enable manufacturers to provide equitable warranty services.

Systems and methods for securely tracking resources are described herein. More specifically, systems and methods are described for using memory tags or "Memory Spots" attached to resources to securely track parameters associated with the resources. It should be appreciated that essentially any object in which a memory tag can be included or to which a memory tag can be attached can be considered in this context. Also, the parameter or parameters which may be monitored may be varied. Use of such a memory tag in accordance with embodiments of the present specification is discussed below.

A suitable memory tag will first be described, followed by a discussion of the use of a memory tag with an object for which usage is to be tracked. The present specification will also describe processes involved in storing parameter-related information within such a memory tag, and subsequently using such parameter-related information.

As used in the present specification and appended claims, a memory tag is a transponder device with sufficient memory to store significant digital content in addition to simple identifier data. Data may be written into the memory or read from the memory by a scanner device. In one exemplary embodiment, a memory tag may be designed to be read by a suitable scanner device at close range and to provide rapid data transmission. For example, data can thus be read by "brushing" the scanner device across the memory tag.

FIG. 1 shows a schematic diagram of one illustrative embodiment of a Radio Frequency Identification (RFID) tag-type memory tag (10). Such a tag is inductively or radiatively powered by a radio frequency (RF) signal (8) received from a scanner (7). The tag (10) is also read by and, in embodiments, receives and writes data from such a scanner device (7).

The memory tag contains an antenna (1) to receive a signal from the scanner device (7). Transponder circuitry (2) extracts power from the received signal to power the memory tag (10) and conveys data signals to the other elements of the memory tag. The transponder circuitry (2) also receives data signals from the read data circuit (3), which the transponder conveys to the antenna (1). The antenna transmits the data as a wireless signal (9) which is received by the scanner device (7).

The read data circuit and transponder circuitry can encode information in the transmitted signal in a variety of ways. For example, the read data circuit can encode data provided from the tag memory (6) by varying a resonant circuit of the transponder circuitry (2).

In some embodiments, a write data circuit (4) is provided to detect data to be written to the tag memory (6). The write data circuit (4) routes the received data through the control logic (5). Control logic (5) is provided to control the operations of the memory tag (10) in response to the signals (8) received from the scanner device (7).

The control logic (5) will vary in complexity depending on the nature of the memory tag. For a tag which, once manufactured, can only be read and not written to, control logic (5) may be simple or omitted entirely. For example, when the tag receives sufficient power from the antenna, it may simply transmit its contents from beginning to end repeatedly.

Higher levels of functionality may be incorporated into the memory tag by incorporating more complex control logic. For example, a read-only tag may initially return only a first set of data, but would be responsive to a specific signal from the reader to return a second set of data instead, for example, from a list of choices provided in the first set of data. Similarly, a tag which can be both read and written to requires sufficient control logic such that the scanner (7) can prepare the tag (10) to receive data for writing to the tag memory and to stop such writing. For example, the scanner (7) can provide an "end of data" signal or specify the number of bits of data to be written in advance. The control logic in such examples is configured to interpret and execute commands received from the scanner. Where more complex operation is required from the memory tag, control logic (5) may be a suitable processor. An example is discussed further with reference to FIG. 3 below.

Figure 2:
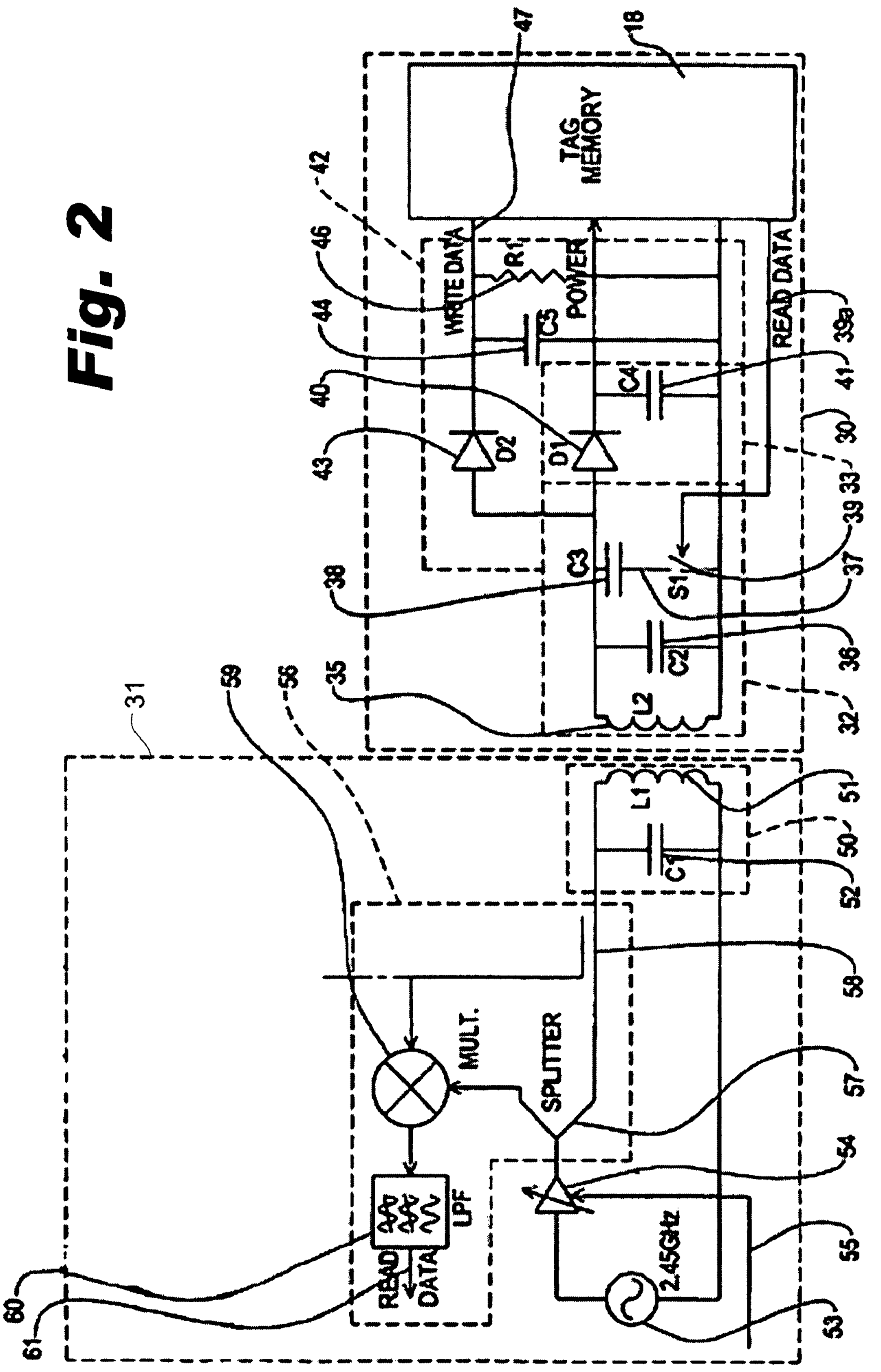
FIG. 2 is schematic diagram of one illustrative embodiment of a memory tag, according to principles described herein.

FIG. 2 shows one exemplary embodiment of a memory tag (30) and its associated read/write device (31). The tag (30) comprises a resonant circuit (32) and a rectifying circuit (33), together with a memory (18). The resonant circuit (32) comprises an inductor L2 (35) and a capacitor C2 (36) connected in parallel.

The resonant circuit (32) further comprises a controllable capacitive element generally indicated at (37). The controllable capacitive element comprises a capacitor C3 (38) and a switch S1 (39) which is connected to a read data line (39). The capacitor C3 (38) is intermittently coupled to the other components in the resonant circuit to modulate the resonant frequency of the resonant circuit (32). The modulation of the resonant frequency of encodes information into the electromagnetic signal transmitted by the inductor L2 (35). The rectifying circuit (33) comprises a diode D1 (40) connected to the resonant circuit (32) in a forward biased direction and a capacitor C4 (41) connected in parallel with the components of the resonant circuit part (32). The rectifying circuit (33) operates as a half-wave rectifier to provide power to the memory (18). The tag (30) further comprises a write data circuit (42). The write data circuit (42) comprises a diode D2 (43) connected in the forward bias direction to the output of the resonant circuit (32), with a capacitor C5 (44) and a resistor R1 (46) connected in parallel with the components of the resonant circuit (32). The write data circuit (42) in this case comprises a simple envelope detector which is responsive to the magnitude of the signal generated by the resonant circuit (32), and provides a write data signal on a line (47) to the memory (18). The "write data" may include control data which is received and interpreted by control logic. For purposes of this example, the control logic can be considered to be contained within memory (18).

The read/write device (31) comprises a resonant circuit (50) which comprises an inductor L1 (51) and a capacitor C1 (54) connected in parallel. A frequency generator (53) is connected to the resonant circuit (50). The read/write device (31) further comprises an amplitude modulator (54) which is controllable in response to data sent on a write data line (55). The amplitude modulator (54) controls the power of the signal from the frequency generator (53) to the resonant circuit (50), and thus provides modulation of the amplitude of the power of the signal generated by the resonant circuit (32) which can be detected by the write data circuit (42) of the tag (30).

The read/write device (31) further comprises a demodulator (56). The demodulator (56) comprises a splitter (57) connected to the frequency generator (45) to split the signal to provide a reference signal. A coupler (58) is provided to split the signal reflected back from the resonant circuit (50). The reference signal and reflected signal are passed to a multiplier indicated at (59). The multiplier (59) multiplies the reflected signal and the reference signal and passes the output to a low pass filter (60). The low pass filter (60) passes a signal corresponding to the phase difference between the reference signal and the reflected signal to an output (61). By controlling the switch S1 (39) of the tag (30) under control of the memory (34), the resonant frequency of resonant circuit (32) can be modulated and hence the phase of the reflected signal reflected by the resonant circuit part (50) with respect to a reference signal can be modulated. This change of phase is detected by the demodulator (56) allowing data can be read from the tag by the read/write device (31). By this method, data may be transmitted from the tag (30) whilst not significantly affecting the power drawn by the resonant circuit (32).

As indicated above, in some memory tag designs it is desirable for the control circuitry to be provided by a processor. In some circumstances, an application specific processor can be used to minimize power demand. However, any of a range of low-power processor designs may be employed. The use of a processor provides additional flexibility and more sophisticated control of the memory.

Figure 3:
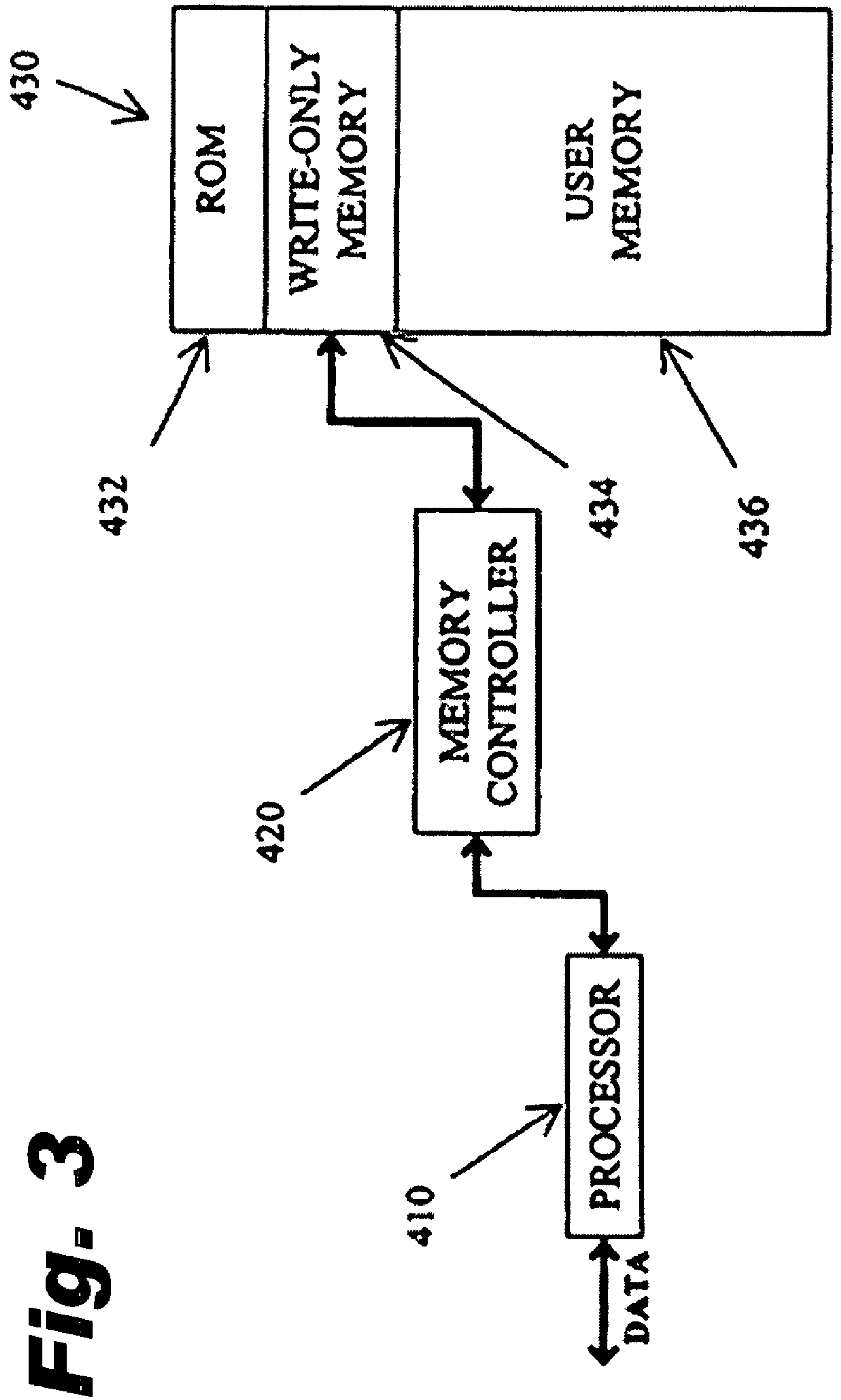
FIG. 3 is schematic diagram of one illustrative memory control system, according to principles described herein.

FIG. 3 shows an arrangement in which the processor (410) receives and sends data. Communication with non-volatile memory (430) is by means of memory controller (420). The processor (410) (or memory controller (420)) may be configured such that some areas of memory (430) are read-only (432). The read-only memory could contain code for operation of the processor (410) or identification information that needs to be protected from alteration. Other segments of memory (430), such as user memory (436), can be both read from and written to. A further possibility is to allow some areas of memory to be written to once, but not to be overwritten subsequently. Such write-once memory (434) may be used effectively in various embodiments as discussed below.

Other approaches may be taken to providing write-once memory. One such approach is to physically change the memory tag after data is written to it. This may be achieved by having a part of the write circuitry disposed so that it can be destroyed after relevant data is written to the memory tag, for example, by burning out a link or otherwise. If this approach is taken, a tag which initially has both read and write capabilities is turned into a read-only tag containing specific read-only data.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary systems and methods of securely tracking ink consumption. It should be appreciated that the exemplary systems and methods discussed below may also be applied to tracking any appropriate resource. For example, in some embodiments, the resources tracked could be components of a laser printer, for example, a dry or wet toner cartridge or a replaceable laser printer fuser assembly.

Exemplary Systems

Figure 4:
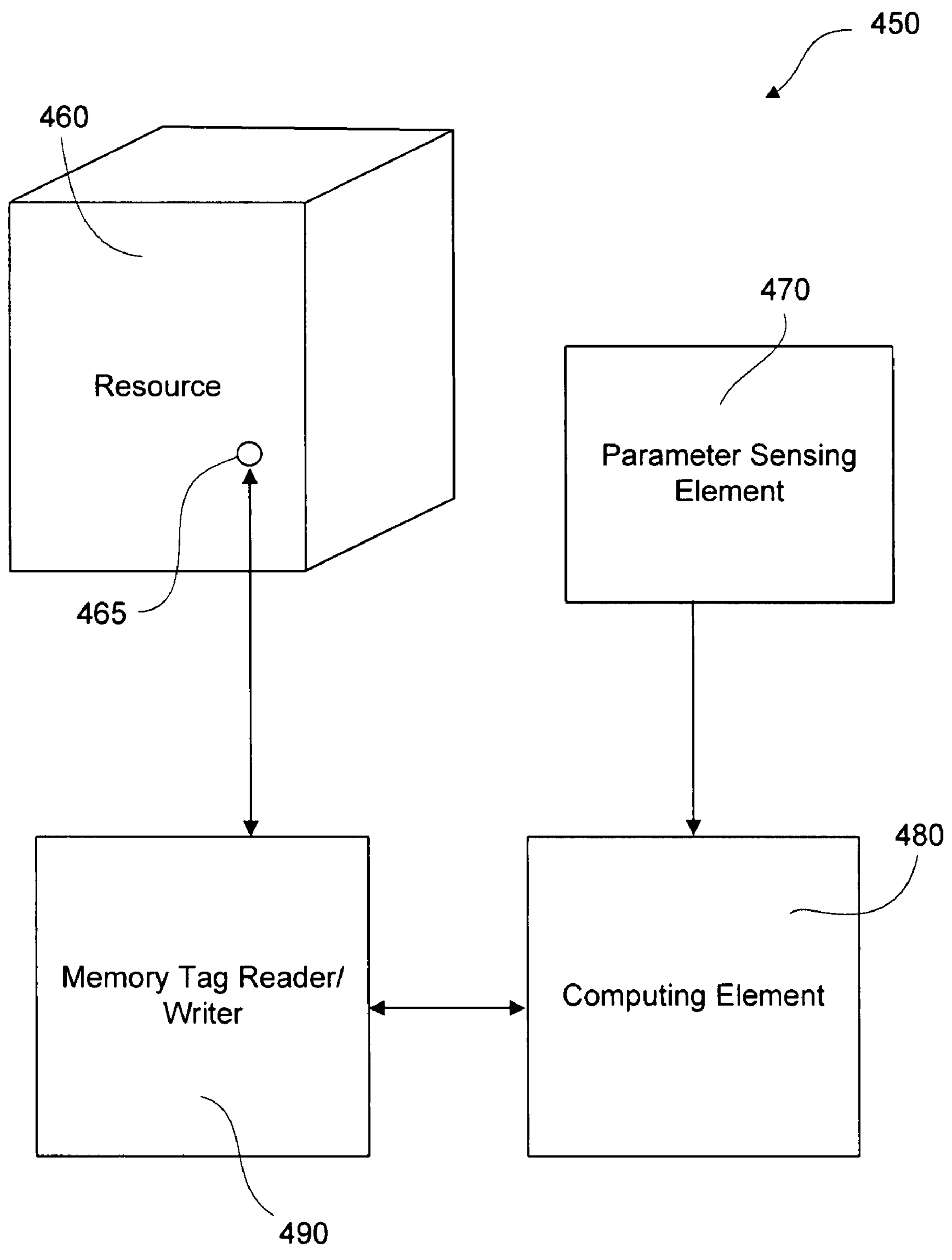
FIG. 4 is a diagram of one illustrative resource monitoring system according to principles described herein.

FIG. 4 is a diagram of an exemplary system for securely tracking resources. The exemplary system (450) includes a resource or product (460) with an attached or integral memory tag (465) configured to store information about the resource (460). The information on the tag (465) is updated and read by a memory tag reader/writer (490) connected to a computing element (480). The computing element (480) may receive information associated with the resource (460) from a parameter sensing element (470). As will be appreciated, in various embodiments, any or all of the parameter sensing element (470), computing element (480) and memory tag reader/writer (490) may be aggregated or integrated into a single unit.

In some cases, the resource (460) may be a consumable resource, such as ink, intended for use in a printer. In other embodiments, the resource (460) may be almost any product. Examples may include automobile parts, electronic equipment, pharmaceutical products, food products, medical devices, or the like.

The information gathered about the resource (460) may also vary according to the particular application. The parameter sensing element (470) of the current embodiment may be a weight sensor, for example, which tracks the weight of the resource (460) as the resource (460) is consumed. In other embodiments, the parameter sensing element (470) may be any sensing element designed to collect and relay information regarding a resource (460). For example, the parameter sensing element (470) may be configured to sense temperature, humidity, vibration, voltage, composition, or similar conditions. The parameter sensing element (470) may be configured to transmit the information it gathers as required, to the computing element (480). In some embodiments, the parameter sensing element (470) may communicate with the computing element (480) through a wired connection. In other embodiments, the connection may be wireless. In different embodiments, the parameter sensing element (470) may be separated from, integrated into, or part of the computing element (480).

The computing element (480) of the present embodiment is configured to receive data from the parameter sensing element (470) and evaluate it in order to determine if any action is required. Under certain conditions, the action taken may include writing to, or reading from, the memory tag (465). In other embodiments, the computing element (480) may be connected to a computer network, such as the Internet, and may send or receive information gathered from the sensor (470) and memory tag (465) to other devices connected to the network. In the present embodiment, the computing element (480) may be configured to request data from the sensing element (470) at randomly generated intervals. The computing element may then send the information received from the sensing element (470) to the memory tag reader/writer (490) in order for the information to be written to the memory tag (465). The memory tag (465) may overwrite the old data with new data or may accumulate sequential data transmissions. In one embodiment, the computing element (480) may subsequently prompt the memory tag reader/writer (490) to transmit the information stored on the memory tag (465). For example, the computing element (480) could prompt the memory tag to transmit its stored data in order to determine if the cumulative effect of the variations in the parameter(s) being sensed by the sensing element (470) have remained below a certain threshold. If the threshold has been exceeded, the computing element (480) may then be configured to take appropriate action. This action may include voiding a warranty, issuing an alert, or similar actions.

The memory tag reader/writer (490), as described above, may also be configured in any of a number of ways. For example, the reader/writer (490) may be a custom device positioned so as to be virtually in contact with the memory tag (465) on a container (460) of ink after the container is installed or otherwise put into use by a printing device. In other embodiments, the reader/writer (490) may comprise a portable handheld device such as a handheld computer or a cell phone. In yet other embodiments, the reader/writer (490) may be a custom device. The reader/writer (490) may communicate with the computing element (480) through a wired or wireless connection. As will be appreciated by those skilled in the art, there are a great many methods and ways in which a reader/writer (490) could be configured. All such configurations are within the scope of the present specification.

The exemplary system (450) discussed above may be used to monitor and record parameters associated with the storage, transportation, and usage of the resource. The present system (450) may be especially useful when local variations in certain parameters can be tolerated, but when the accumulative effect should stay below a certain threshold. The present system (450) may also be used to provide an anti-counterfeit measure to a resource (460) and to detect the use of alternative-brand consumable resources when such use infringes warranty or service conditions.

FIGS. 5-11 illustrate a specific example of the principles disclosed herein as applied to monitoring the usage of liquid content, such as ink, in a container. As shown in FIGS. 5-11, this system can detect the use of third-party inks in a printing system.

Figure 5:
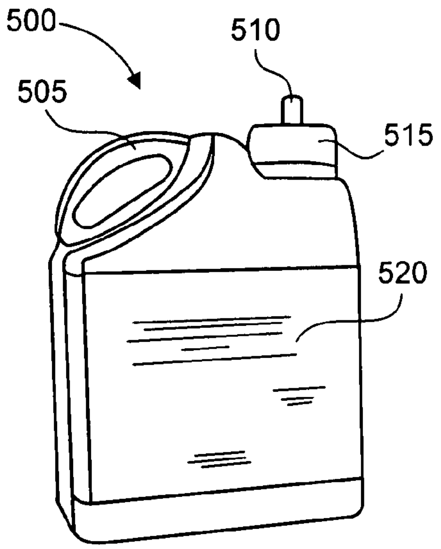
FIG. 5 is a perspective view of one illustrative embodiment of a resource container with an attached memory tag, according to principles described herein.

Turning first to FIG. 5, an exemplary resource is shown. The resource depicted is a container of ink (500) suitable for use in an industrial printer or printing press. The ink container (500) may be made from any number of materials suitable for storing a liquid such as high density polyethylene. The container (500) may comprise an integrally molded handle (505). Also, many suitable containers may comprise a lid (515), which may be a screw-type lid, which also may include a tube connection member (510). Also included on the exemplary container is a label (520) which contains information about the type of ink and usage instructions.

Figure 6:
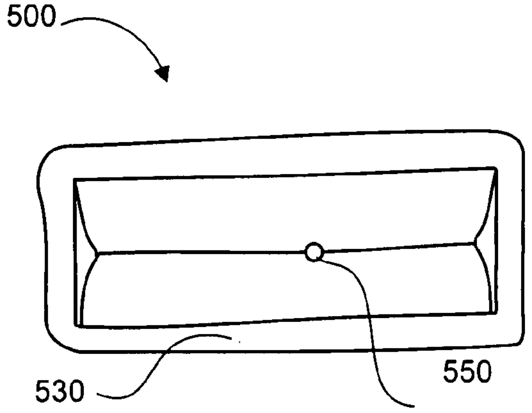
FIG. 6 is a bottom view of one illustrative embodiment of a resource container with an attached memory tag, according to principles described herein.

FIG. 6 shows a bottom view of the container (500). The bottom (530) of the exemplary container (500) comprises a memory tag (550) as described above. The memory tag (550) of the present example is preferably fixed to the bottom (530) of the container (500) in an irreversible manner. For example, the memory tag (550) may be adhered to the container (500) using a suitable permanent adhesive. Alternatively, the memory tag (550) may be fixed to the container (500) in an irreversible manner during the manufacture of the container (500). The advantage of incorporating the memory tag (550) within the container (500) at the time of manufacture or permanently adhering the memory tag (550) to the container (500) is that there is no possibility of the memory tag (550) becoming disassociated from the container (500). If the memory tag (550) is affixed to the bottom (530) of a container (500), it may also be preferable to recess the tag (550) slightly to avoid damage to the tag (550) due to contact with the ground or other support surface.

The memory tag (550) of the present example may include write-once-read-many (WORM) type memory, so that data stored on the tag (550) cannot be modified or deleted. The memory tag (550) may also be protected through the use of private key encryption. Consequently, ink consumption can be monitored and a log of this data stored in the memory tag (550). The presence of a valid memory tag (550) and a strictly decreasing weight are evidence that the ink being used in the printer or press is the manufacturer-approved ink originally in the container (500). An increase in the weight of the ink container (500) containing a valid memory tag (550), a container (500) without a memory tag (550), or the re-use of a memory tag (550) may all represent the use of alternative-brand inks which may damage the printing system and void the warranty. If the use of alternative-brand inks is detected, then an alert may be issued and securely logged on a computing element or printer.

Figure 7:
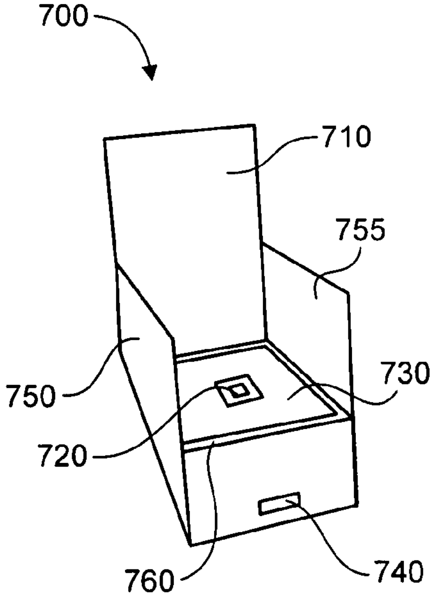
FIG. 7 is a perspective view of an exemplary resource container positioning element, according to principles described herein.

FIG. 7 illustrates a resource positioning element (700) with an integrated parameter sensor (730) and a memory tag reader/writer (720). Positioning the memory tag in close proximity to the reader/writer (720) allows for additional flexibility in designing the memory tag and allows for the close proximity of multiple ink containers. The resource positioning element (700) of the present embodiment consists of a bottom member (760), a first side member (750), a second side member (755), and a back member (710). The bottom member (760) of the current embodiment also includes a weight sensing plate (730) and a memory tag reader/writer (720). In some embodiments, the resource positioning element (700) may also include a digital interface port (740) which may be configured to allow transmission of data between the memory tag reader/writer (720) or parameter sensor (730) and a computing element.

The bottom member (760) is positioned so as to slope slightly towards the back member (710) so that it can be assured that a resource (500) placed on the bottom member (760) will slide back until resting against the back member (710). In this manner, a resource (500) correctly placed on the positioning element (700) will automatically be positioned with the memory tag (550) situated above the reader/writer (720). In other embodiments, the resource positioning element (700) and the resource (500) may be complementarily shaped so that the resource (500) will only fit in the positioning element (700) when the resource (500) is correctly aligned with respect thereto.

Figure 8:
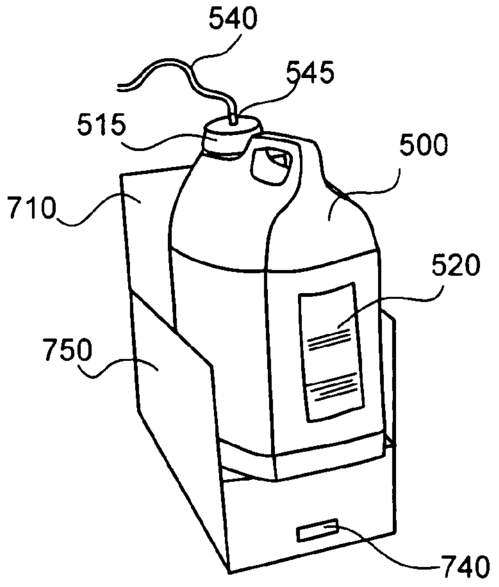
FIG. 8 shows an exemplary resource container and positioning element, according to principles described herein.

Turning now to FIG. 8, the container or resource (500) is shown placed on the resource positioning element (700). The resource (500) is resting on the bottom member (760, FIG. 7) of the positioning element (700) with the back of the resource (500) touching the back member (710). The memory tag (550, FIG. 6) on the resource is thus situated directly above the memory tag reader/writer (720, FIG. 7). The container (500) is stabilized by the side members (750, 755), which also prevent the resource (500) from resting on an adjacent surface which could cause false weight readings. The resource container (500) also includes a label (520), handle (505), lid (515), tube connection member (545), and a connected pump tube (540). The pump tube (540) may be used to suction ink from the container (500) and provide it to the printer.

Figure 9:
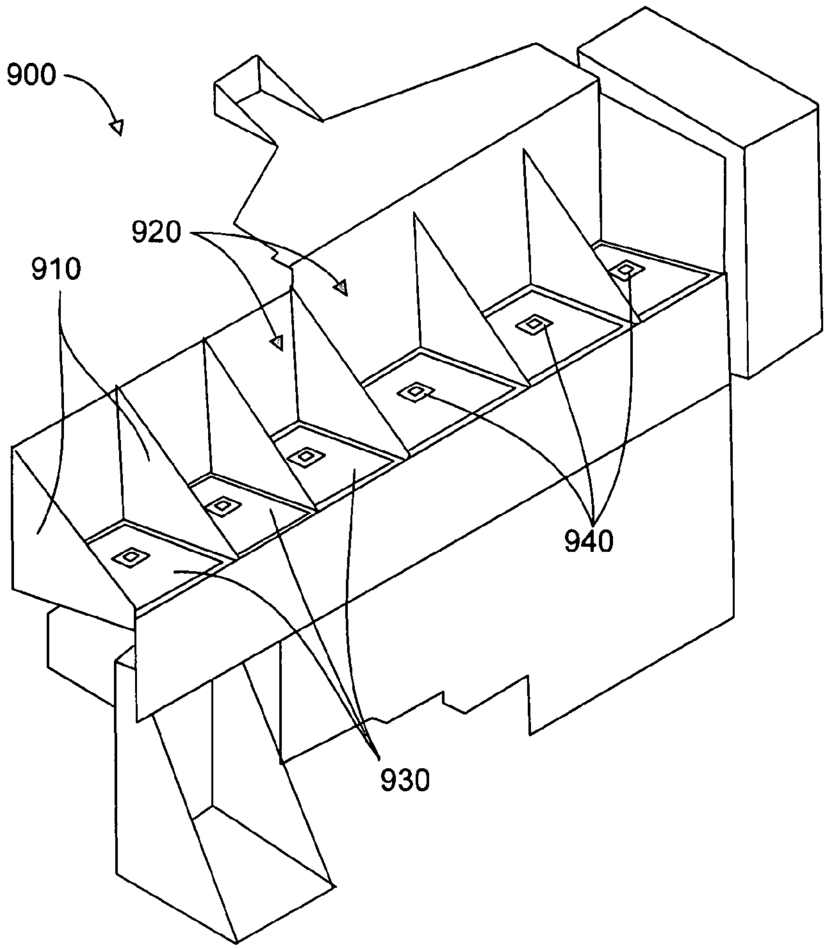
FIG. 9 is a perspective view of a plurality of plates configured to receive resource containers, according to principles described herein.

FIG. 9 shows a perspective view of a fixture (900) which comprises a plurality of adjacent resource positioning elements (920). Each positioning element (920) includes a weight sensor (930) and a memory tag reader/writer (940). The positioning elements (920) also each have left and right members (910) which serve to aid in the correct positioning of the resource containers and also to separate the individual containers.

Figure 10:
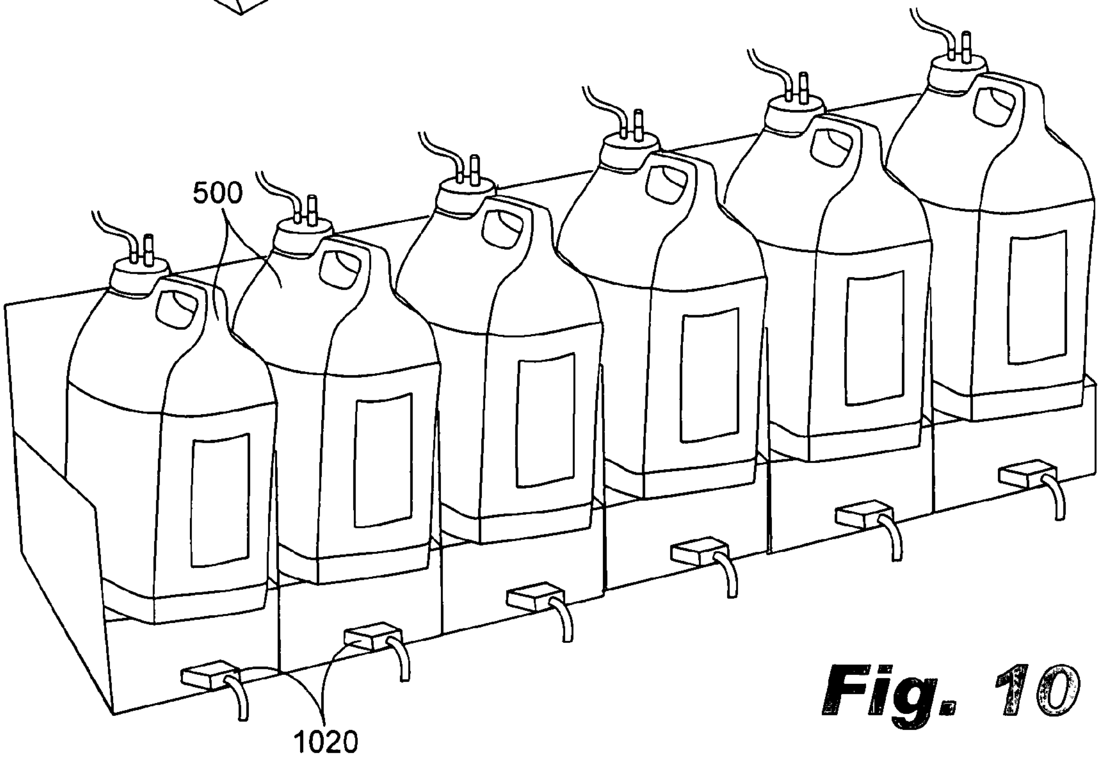
FIG. 10 is a perspective view of a plurality of plates configured to receive resource containers, according to principles described herein.

Turning now to FIG. 10, six resource containers (500) are shown positioned in their respective positioning elements (920) and on respective sensor plates in each positioning element (920) as described above. Also shown are digital interface connections (1020) which may be configured to allow transmission of data between the memory tag readers/writers or weight sensors and a computing element.

Figure 11:
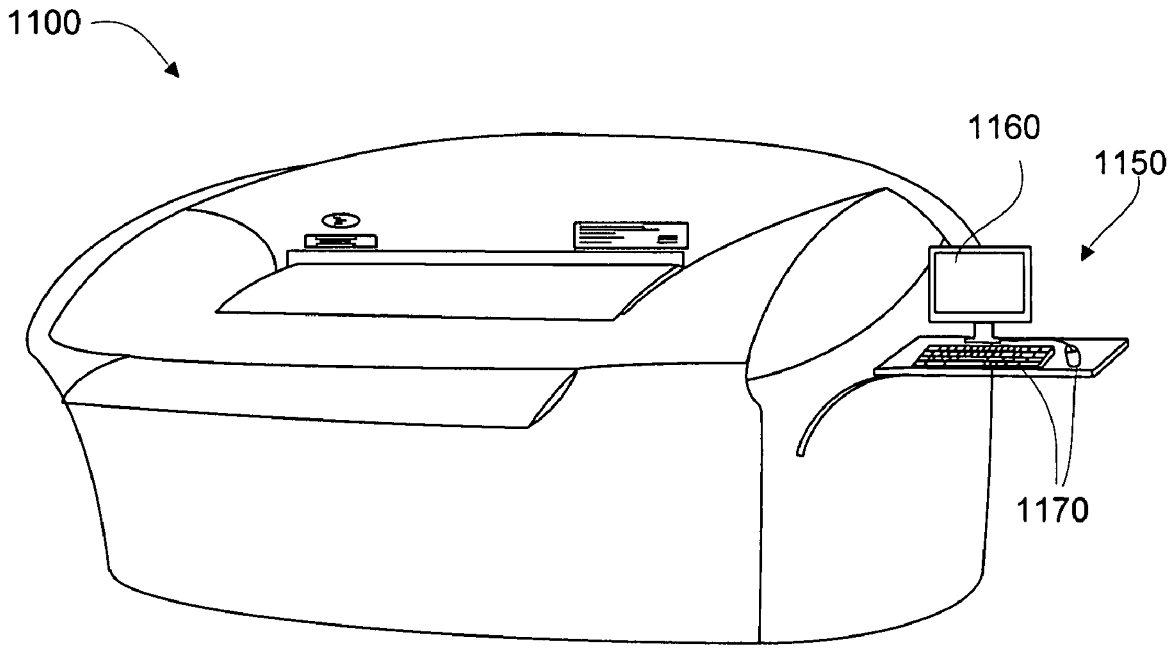
FIG. 11 shows one illustrative embodiment of a printing system configured to use resource containers with attached memory tags, according to principles described herein.

FIG. 11 shows one illustrative embodiment of a printing system configured to use resource containers with attached memory tags. The printing system (1100) may include an internal or external computing element (1150). The computing element (1150) may include a display or monitor (1160) and user input devices (1170) such as a keyboard, touch-screen, or a mouse. The user may be able to interact with the printer through the use of printer user interface software.

Exemplary Method

Figure 12:
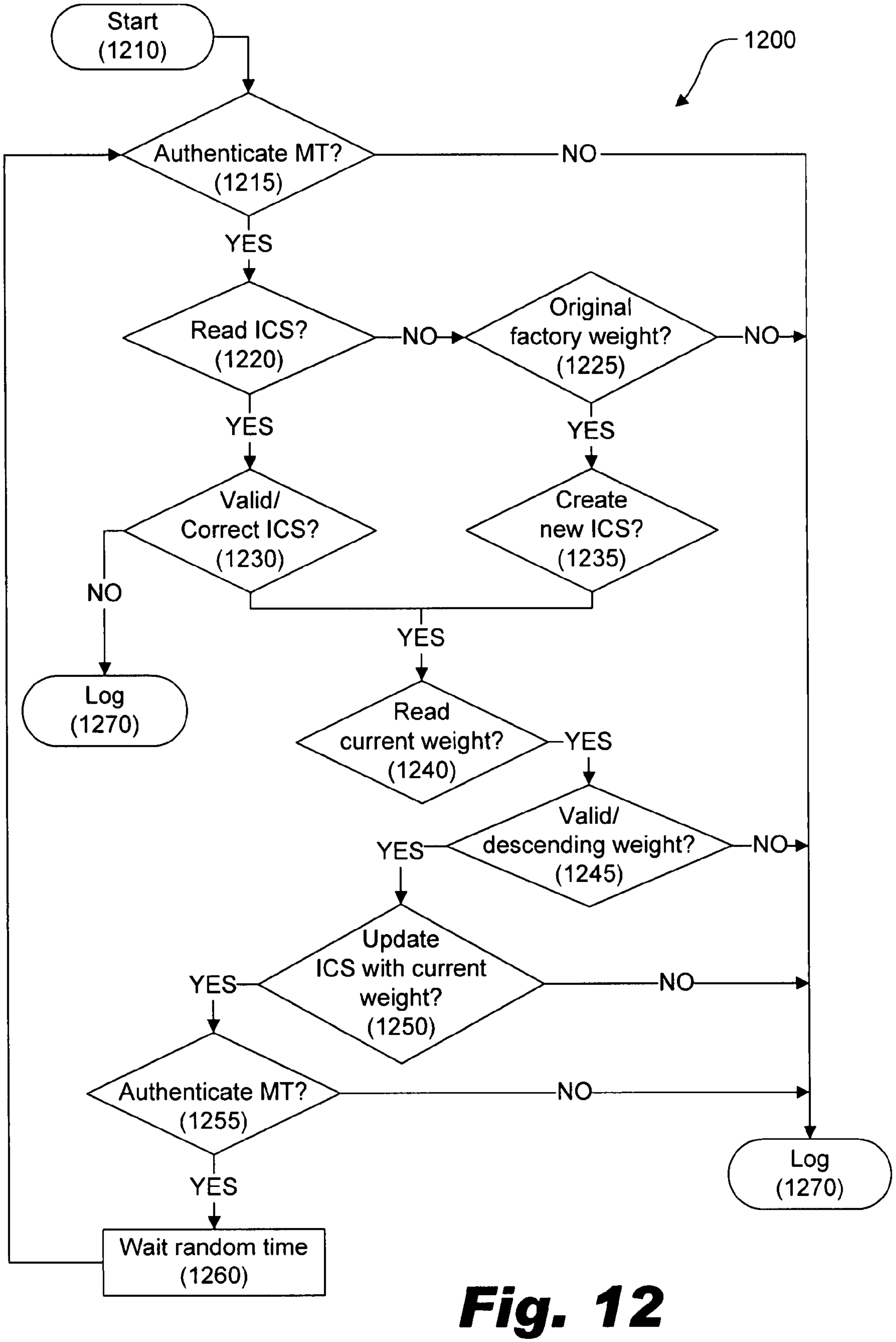
FIG. 12 is a flowchart illustrating an exemplary method of using a memory tag to track the use of a resource, according to principles described herein.

Referring now to FIG. 12, an exemplary method (1200) of securely tracking a resource parameter is illustrated. The exemplary method (1200) provides a way to detect the use of third party inks in a printing system by securely tracking the weight of the ink supply. The exemplary method (1200) illustrates a sequence of operations that may be repeated at random but sufficiently small time intervals.

The method (1200) begins when the reader/writer (720, FIG. 7) attempts to authenticate (step 1215) the memory tag (550, FIG. 6) on the ink container (500, FIG. 5). The factory-written ink and product information is read from the memory tag (550, FIG. 6) and the memory tag's integrity and authenticity may be checked through the use of a digital signature. Other methods may also be employed to authenticate the memory tag (550, FIG. 6). The memory tag's identification (ID) may be compared to an ID written to the memory tag by the ink factory. Also, a random challenge may be generated, and the tag's reply verified. If there is no memory tag present, or the memory tag is unable to be authenticated, that information may be securely logged (1270) in the printer's memory and an alert issued to the user or manufacturer.

After authenticating the tag, the tag's ink consumption sequence (ICS) is read (step 1220). The ICS should contain a valid transaction ID for every existing entry, and each entry should be a monotonically decreasing reading of the ink's weight. If there is no ICS on the tag, the original weight of the ink may be retrieved from the factory by retrieving the memory tag's ID and referencing a manufacture database. In another embodiment, the factory weight data could be securely written to the memory tag. If the current weight of the ink is the original factory weight (step 1225), then an ICS is created (step 1235) and written to the tag. If the current weight is not the same as the factory weight, then that information may be securely logged (1270) in the printer's memory and an alert issued.

If there is an ICS on the tag, then the ICS is validated or authenticated (step 1230). If the ICS cannot be authenticated, then an alert is issued, and the information is logged (1270) in the printer's memory. If the ICS is valid, then the current weight of the ink is read (step 1240). If the weight of the ink is equal to or less than the latest weight recorded on the tag (step 1245), then the ICS on the tag is updated with the current weight (step 1250). Each ICS entry may be signed with a special private signature key for authentication purposes. If the current weight is greater than the last recorded weight in the ICS, or if the ICS cannot be updated, then an alert is issued and logged (1270).

The memory tag is then authenticated (step 1255) again, and then after a random amount of time (step 1260), the process is repeated. In the event that the usage of a third-party ink is detected by the method described above, the printer may suspend its normal operations on at least the first occasion and issue a warning to the customer. Normal operations may be resumed when feedback is received indicative of the customer's acknowledgment of the situation. The information logged in the printer may be preserved in a secure way so that it cannot be tampered with or deleted until service personnel can access it when the printer is serviced. In various embodiments, the action taken when use of a third-party component is detected may include any or all of displaying a warning, ceasing operation, alerting a manufacturer or user, or logging data.

Figure 13:
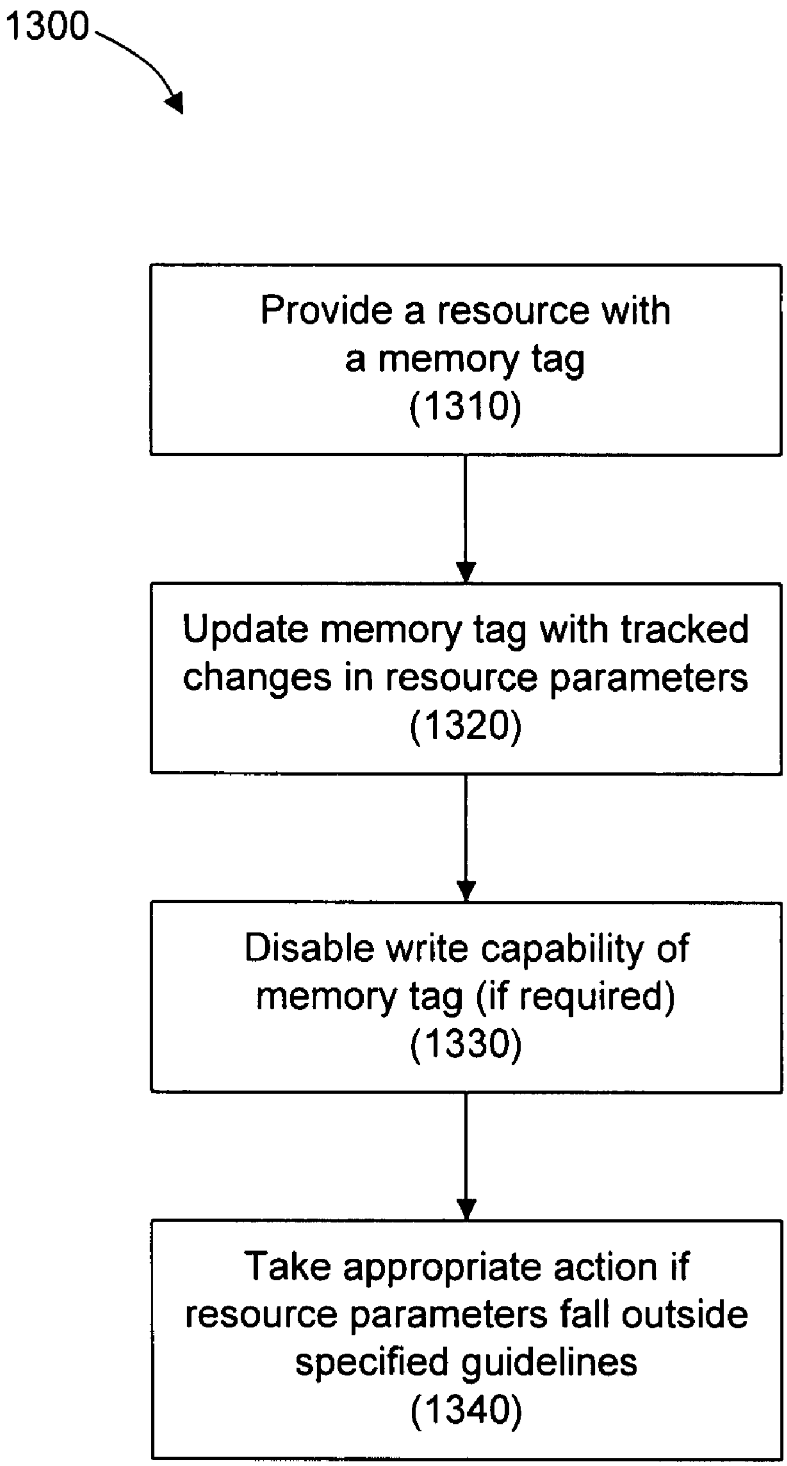
FIG. 13 is a flowchart illustrating an exemplary method of using a memory tag to track the use of a resource, according to principles described herein.

Referring now to FIG. 13, an exemplary method (1300) of securely tracking a resource parameter is illustrated. A variety of parameters can be measured and tracked including temperature, composition, voltage, weight, pressure, humidity, viscosity, changes in concentration, float level and date and time, or other parameter of interest. The method begins by providing (step 1310) a resource with a memory tag. The memory tag may be attached to the product itself or to the product's packaging. The memory tag may be attached by any means suitable to securely associate the tag with its corresponding product.

This tag is then updated (step 1320) with tracked changes in resource parameters. The tag may be updated at regular intervals, upon a change in the parameter, or at random intervals. The information regarding the changed parameter may be stored directly on the memory tag. This information in some embodiments may be encrypted or otherwise authenticated.

After writing to the memory tag, the write capability of the tag may be disabled (step 1330) to protect the information contained within the tag. In some embodiments, the memory contained within the tag may be WORM memory. If the changed resource parameters fall outside of specified guidelines, appropriate action may then be taken (step 1340). Examples of such actions include sending a warning, activating a light, or voiding a warranty.

This method (1300) may be useful to monitor the conditions of storage, usage, deployment, etc. are met during resource transportation, storage, or consumption, especially when local variations in the tracked parameters can be tolerated, but the accumulative effect should stay within certain thresholds. For example, the failure to observe the specified thresholds could result in a warranty being voided or in a product becoming unsuitable or even unsafe for subsequent use.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A system for tracking resource parameters, said system comprising:

a container of ink having an associated memory tag;

a parameter sensing element sensing a weight of said container of ink; and a memory tag reader/writer;

in which said system is configured to identify said container of ink based on said memory tag;

in which said system is configured to store information gathered from said parameter sensing element on said memory tag; and in which said system is configured to verify a strictly decreasing weight of said container of ink for detecting use of an alternative-brand ink.

2. The system of claim 1, wherein said parameter sensing element is further configured to sense one or more resource parameters selected from the group of: temperature, voltage, composition, pressure, humidity, viscosity, changes in concentration, float level, date and time, and combinations thereof.

3. The system of claim 1, further comprising a computing element communicatively coupled with said parameter sensing element and memory tag reader/writer, wherein said computing element is configured to perform an action if a combined effect of changes in said resource parameters falls outside of a specified threshold.

4. The system of claim 3, wherein said action comprises voiding a warranty.

5. The system of claim 3, wherein said action comprises display of a warning, ceasing operation, alerting a manufacturer or user, or logging data.

6. The system of claim 3, wherein said computing element is associated with a printing system.

7. The system of claim 1, wherein said memory tag is integrally attached to said resource.

8. The system of claim 1, further comprising a resource positioning element configured to position said resource such that said memory tag is positioned adjacent said memory tag reader/writer.

9. The system of claim 1, wherein said memory tag comprises Write Once Read Many memory.

10. The system of claim 1, wherein said memory tag is protected by encryption.

11. The system of claim 1, wherein said resource comprises a laser printer toner cartridge.

12. The system of claim 1, wherein said resource comprises a laser printer fuser assembly.

13. A method of monitoring ink usage in a printing system, said method comprising:

placing an ink container in a resource positioning element wherein said resource positioning element is configured to align a memory tag secured to said ink container and a memory tag reader/writer with a slopping bottom member of said resource positioning element so that said resource will slide to align said memory tag with said memory tag reader/writer; and recording changes in a weight of said ink container on said memory tag secured to said container.

14. The method of claim 13, wherein said resource positioning element comprises a weight sensing element.

15. The method of claim 13, further comprising:

validating an ink consumption sequence on said memory tag; and updating said ink consumption sequence with said current weight.

16. The method of claim 15, wherein a failure or inability to perform said step of validating an ink consumption sequence results in an additional step of creating an new ink consumption sequence if the current weight of said ink container equals an original factory weight of said ink container or issuing an alert otherwise.

* * * * *